C. P. STRITE.
BREAD TOASTER.
APPLICATION FILED MAY 29, 1919.
1,387,670.
Patented Aug. 16, 1921.
3 SHEETS—SHEET 1.
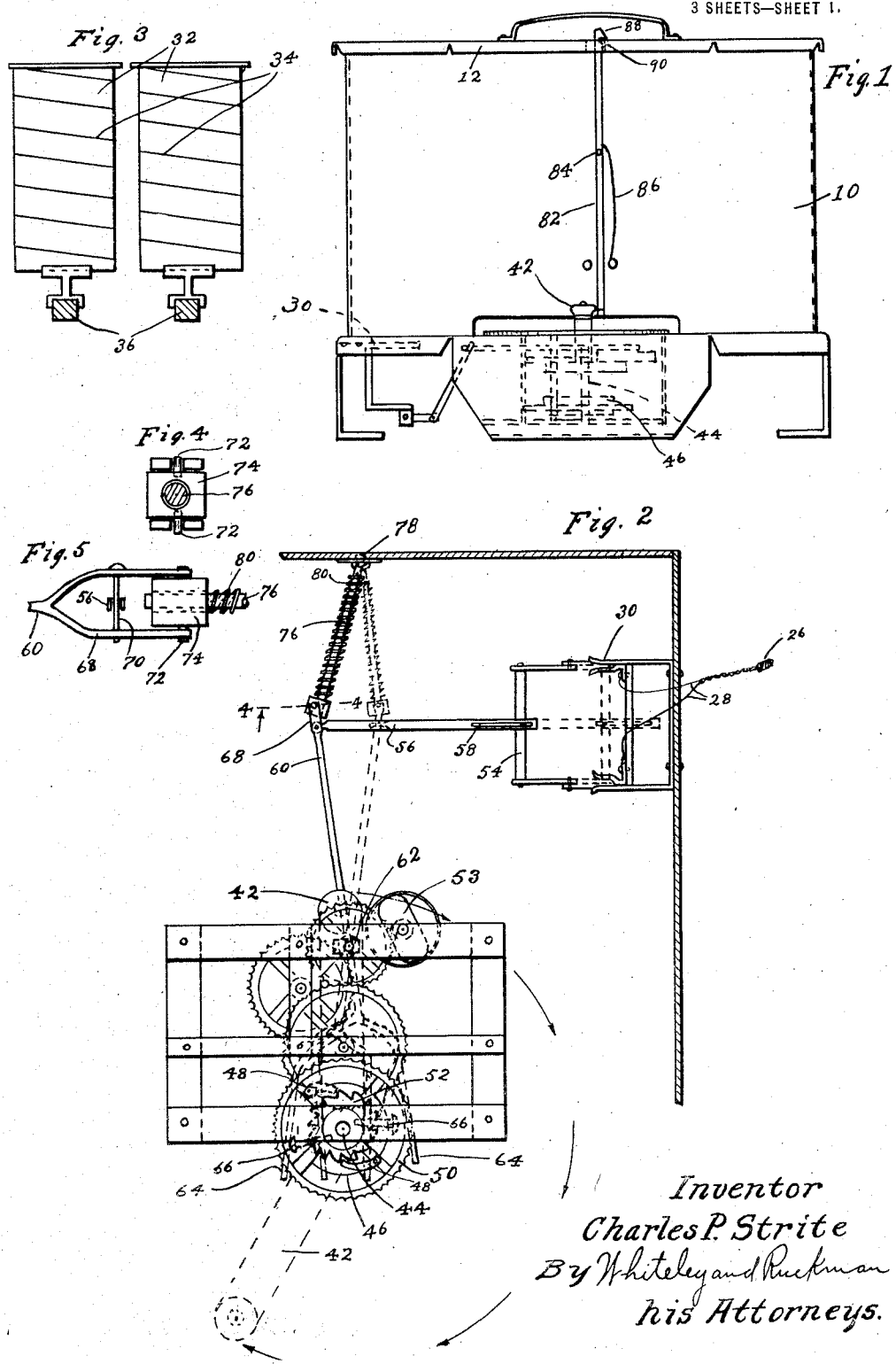
Inventor
Charles P. Strite
By Whiteley and Ruckman
his Attorneys.

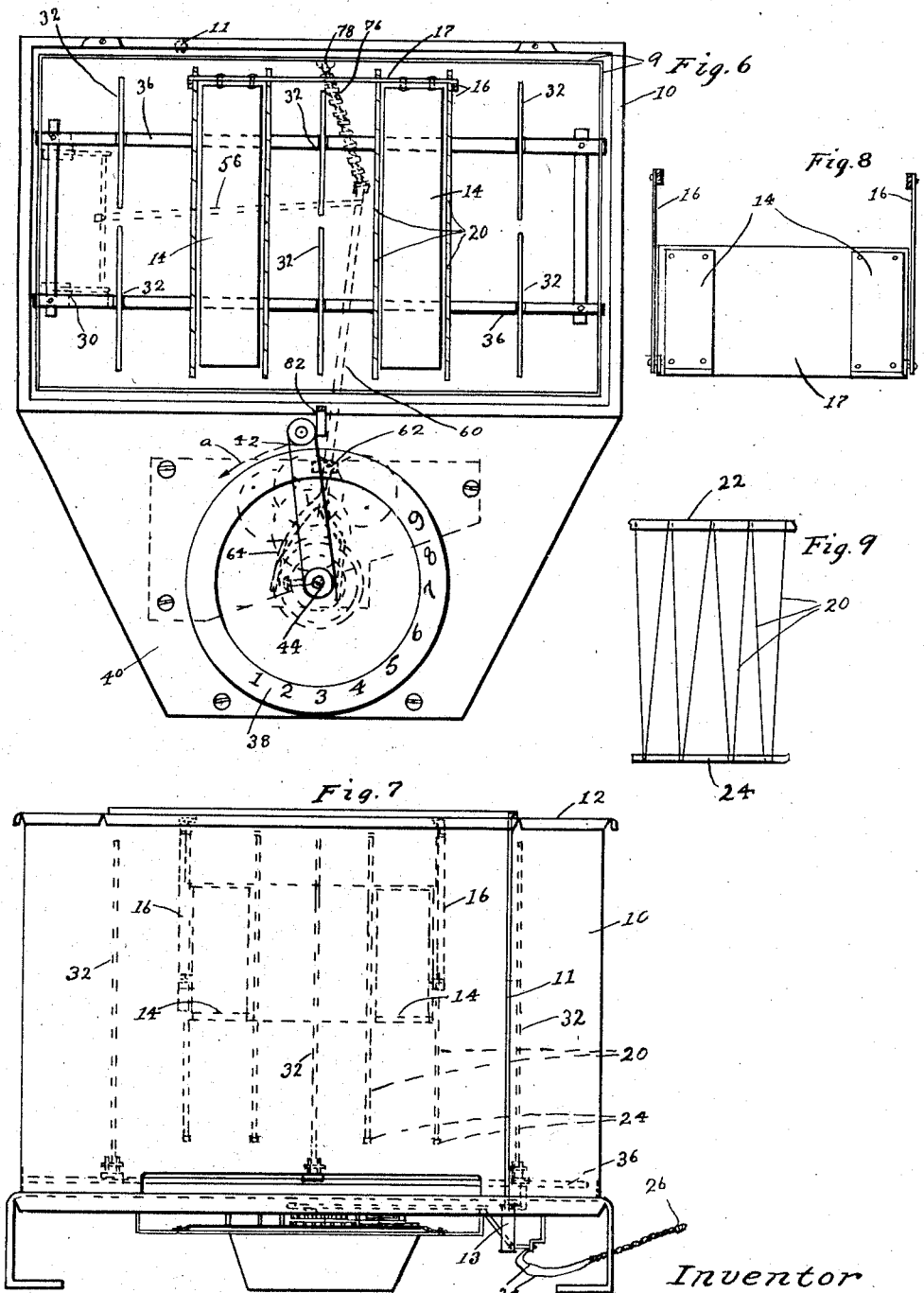

C. P. STRITE.
BREAD TOASTER.
APPLICATION FILED MAY 29, 1919.

1,387,670.

Patented Aug. 16, 1921.
3 SHEETS—SHEET 3.

Inventor
Charles P. Strite
By Whiteley and Ruckman
his Attorneys.

UNITED STATES PATENT OFFICE.

CHARLES P. STRITE, OF MINNEAPOLIS, MINNESOTA.

BREAD-TOASTER.

1,387,670.

Specification of Letters Patent.

Patented Aug. 16, 1921.

Application filed May 29, 1919. Serial No. 300,677.

*To all whom it may concern:*

Be it known that I, CHARLES P. STRITE, a citizen of the United States, residing at Minneapolis, in the county of Hennepin and State of Minnesota, have invented certain new and useful Improvements in Bread-Toasters, of which the following is a specification.

My invention relates to bread toasters and an object is to provide a device of this character which may be set to toast bread for different lengths of time according to the degree of crispness desired and in which the heat will be automatically cut off after the expiration of a period of time dependent upon the time for which the device is set. Another object is to provide a device of this character in which the bread to be toasted is inclosed in a casing while being toasted, thus utilizing the heat to the maximum extent. Another object is to provide a device having a cover which is automatically thrown open a short time after the heat has been cut off, whereby the toasting is completed by the stored heat. Another object is to provide a device in which the toasted bread is lifted partly out of the casing when the operation is completed.

The full objects and advantages of my invention will appear in connection with the detailed description thereof and the novel features embodied in my inventive idea will be particularly pointed out in the claims.

Referring to the accompanying drawings, which illustrate the application of my invention in one form,—

Figure 10:
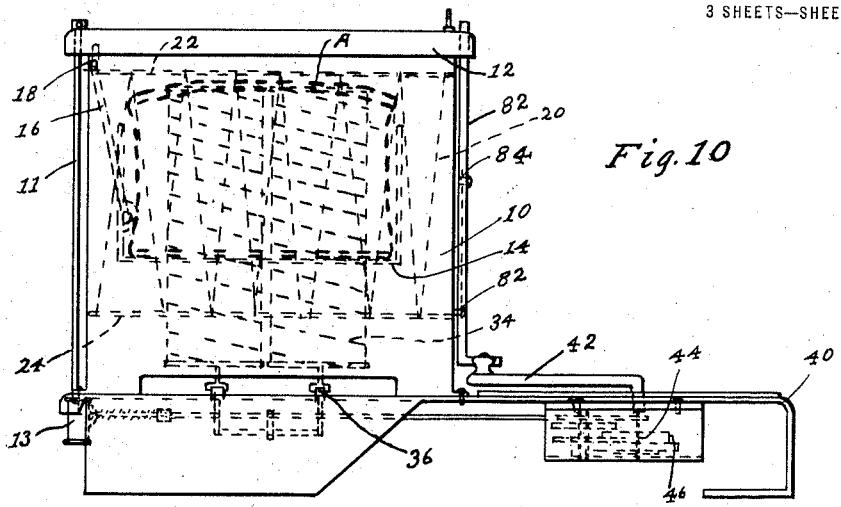
Figure 11:
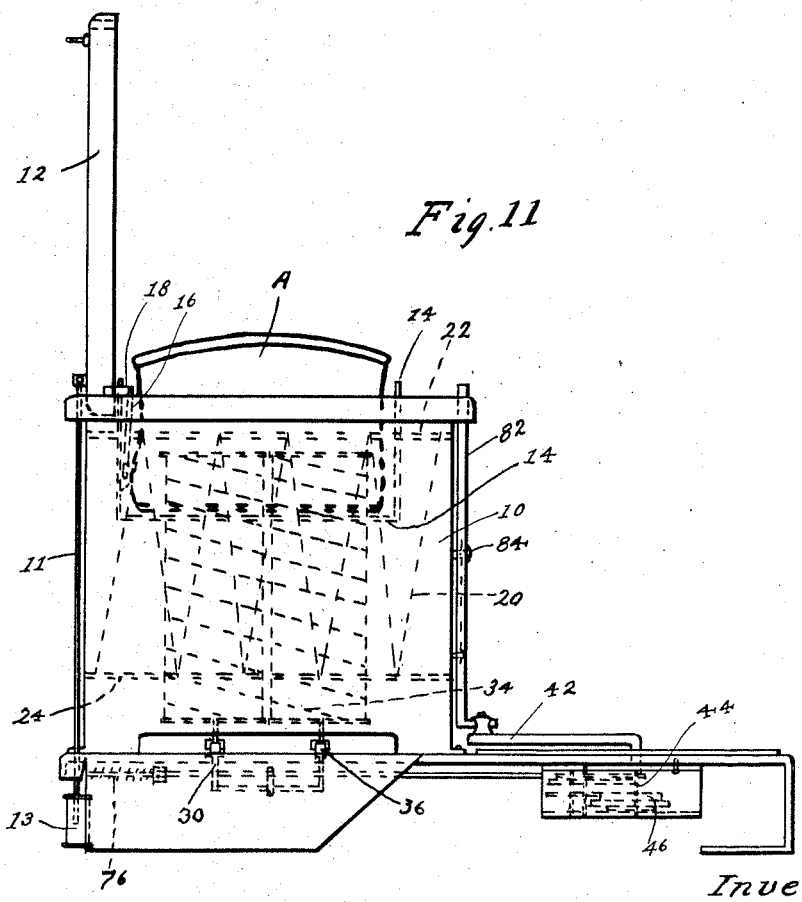

Figure 1 is a front elevational view. Fig. 2 is a bottom plan view. Fig. 3 is a side view of the heating elements. Fig. 4 is a view in section on the line 4—4 of Fig. 2. Fig. 5 is a detail view of a toggle connection. Fig. 6 is a top plan view with the cover removed. Fig. 7 is a rear elevational view. Fig. 8 is a front elevational view of two bread trays. Fig. 9 is a detail view showing the structure adjacent the sides of the bread trays. Fig. 10 is a side elevational view showing the cover closed and some of the interior construction in dotted lines. Fig. 11 is a view similar to Fig. 10 but showing the cover in its open position and the bread partly lifted out of the casing.

Referring to the particular construction shown in the drawings, 10 designates a casing preferably constructed of sheet metal within which and spaced from the walls thereof is an asbestos lining 9. The casing is provided with a cover 12 attached to the rear thereof by a spring hinge which tends to throw the cover up into open position. A rod 11 secured to the cover is operatively connected with a dash-pot 13 to cushion the cover when it is thrown back by the spring hinge. Bread trays 14 for holding slices of bread are connected to the cover for movement therewith by means of links 16 attached to the rear plate 17 connecting the trays and pivoted at their upper ends to lugs 18 secured to the cover. In the embodiment illustrated in the drawings, two bread trays are shown and adjacent the sides of the trays is a structure formed by passing a wire 20 back and forth over upper and lower rods 22 and 24, as best shown in Fig. 9. The trays on account of their attachment to the cover occupy the position shown in Fig. 11 when the cover is open, and the position shown in Fig. 10 when the cover is closed. A slice of bread A is placed in each of the trays when the cover is open and when the cover is closed the trays are depressed and the slices are, therefore, entirely inclosed in the casing. A set of heating elements such as shown in Fig. 3 is placed between the two trays and also at the outer sides of each tray, and an electric current is supplied to these heating elements by means of a plug connector 26 having connections 28 leading to the binding posts of an automatically-operated switch 30 which will be described later. Each heating element may be conveniently constructed, as shown in Fig. 3, of a sheet of mica 32 upon which are wrapped coils of wire 34, and the mica sheets are supported on bars 36 attached within the casing. A dial 38 provided with numerals is attached to a plate 40 extending out from the front of the device, and a handle member 42 secured to a shaft 44 is adapted to travel over the face of the dial. A coil spring 46 is wound when the handle 42 is turned in the direction of the arrow *a* in Fig. 6 to bring it over the desired one of the numerals on the dial, and when the handle is released a pawl 48 pivoted on a gear 50 engages a ratchet wheel 52 and drives a clock-work mechanism of usual construction provided with a governor 53. The switch 30 has a crossbar 54 to which a rod 56 is attached by a slotted connection 58 as shown in Fig. 2. The other end of the rod 56 is pivoted to a lever arm 60, which in turn is pivoted to a support at 62. One end of the arm 60 is provided with a fork 64 which is adapted to be engaged at certain times by a stud 66 secured to the shaft 44. The other end of the arm is provided with a fork 68, the branches of which are connected by a pin 70 to which the rod 56 is pivoted. The ends of the branches of this fork have notches which engage pins 72 extending out from the two sides of a block 74 slidably mounted on a rod 76, which constitutes the other arm of the toggle. The arm 76 is pivoted at 78 and the coil spring 80 surrounding the arm tends to move the block 74 toward the outer end of the arm. In operation, when the handle member 42 is turned in the direction of the arrow $a$ in Fig. 6 the stud 66 engages the fork 64 and closes the switch 30, as shown in dotted lines in Fig. 2, and turns on the current through the heating elements. When the handle is released it is gradually turned back toward its original position by the coil spring and finally the stud comes into contact with the fork 64 a short time before the handle reaches its original position, thereby straightening the toggle arms. As soon as these arms pass over their dead center the spring 80 completes their movement with a quick snappy action and throws out the switch to the position shown in full lines in Fig. 2 The bread still continues to toast on account of the stored heat until the handle finally strikes the lower end of a lever 82 pivoted to the casing at 84. A spring 86 attached to the lever serves to hold the upper end thereof toward the right as viewed in Fig. 1 and thereby hold a notch 88 in engagement with a projection 90 on the cover to latch the latter in its closed position. When the lever is moved by the handle the cover is unlatched and swings open, thereby lifting the bread trays and exposing the toasted bread for ready removal.

The operation and advantages of my invention will be readily understood from the foregoing description, it being understood that the plug 26 is connected to a suitable socket whereby electrical current may be conveyed to the heating elements when the switch is closed. When the cover 12, the handle 42 and the trays 14 are in the position shown in Fig. 11, a slice of bread is placed in each of the trays and the handle is turned in the direction of the arrow $a$ in Fig. 1, corresponding to the direction indicated by arrows in the bottom plan view shown in Fig. 2. As soon as the handle is moved the notched end of the lever 82 engages the cover to hold the latter in closed position. The stud 66 engages one side of the fork 64 and moves the lever arm 60 into the position shown in dotted lines in Fig. 2 and closes the switch to turn on the current through the heating elements. The operator brings the handle adjacent the desired numeral on the dial, and during this movement of the handle the coil spring 46 is wound. Upon releasing the handle the spring causes it to move in reverse direction, and by means of the ratchet 52 and the pawl 48 the clockwork is driven at a speed regulated by the governor 53. When the stud 66 strikes the other side of the fork 64 the lever arm 60 is moved toward full line position as shown in Fig. 2, the movement being completed with a snappy action by the spring 80 so that the switch is opened quickly and sparking is prevented. The current through the heating coils 34 is thus maintained for a predetermined time, which may be varied according to the particular numeral on the dial selected by the operator. After the switch has been opened the toasting continues on account of the stored heat until the handle strikes the lower end of the lever 82, thus releasing the cover 12 which is opened by the spring hinges, and the trays carrying the slices of toast are simultaneously lifted. This latter part of the operation serves to notify the operator that the toasting is completed, and upon removal of the toast the trays may be again filled and the operation continued until the desired amount of toast is obtained. When the toaster is first started it may either be subjected to a preliminary heating or the operator may move the handle until it is positioned adjacent a higher numeral than is to be employed for subsequent toastings. In the further operation of the machine the operator moves the handle to position adjacent the proper numeral determined by the degree of crispness of the toast which is desired. If the same numeral is selected each time the bread will be toasted to the same degree of crispness for each batch.

I claim:

1. A bread toaster comprising a casing, heating means in said casing, and means for cutting off the supply of heat after the bread has been toasted for a predetermined length of time.

2. A bread toaster comprising heating means, means for supporting slices of bread adjacent said heating means, and timing mechanism operatively connected for cutting off the supply of heat after the slices of bread have been toasted for a predetermined length of time.

3. A bread toaster comprising heating means, means for supporting slices of bread adjacent said heating means, timing mechanism operatively connected for cutting off the supply of heat, and means for setting said timing mechanism for different periods of time.

4. A bread toaster comprising heating means, means for supporting slices of bread adjacent said heating means, a spring, a handle for winding said spring, clockwork mechanism connected with said spring, and means operating in connection with said mechanism when said handle is released for cutting off the supply of heat after a predetermined length of time.

5. A bread toaster comprising electrical heating means, means for supporting slices of bread adjacent said heating means, a switch, and means for closing and then automatically opening said switch after a predetermined length of time.

6. A bread toaster comprising electrical heating means, means for supporting slices of bread adjacent said heating means, a switch, a handle movably supported, and means whereby said switch is closed when said handle is moved in one direction and whereby said switch is opened after a predetermined length of time when said handle is released.

7. A bread toaster comprising electrical heating means, means for supporting slices of bread adjacent said heating means, a switch, a dial having numerals thereon, a handle movably supported whereby it may be positioned adjacent any one of said numerals, and means for automatically opening said switch at varying intervals of time according to the position of the numeral which is selected for the particular cycle.

8. A bread toaster comprising a casing, electrical heating means in said casing, means for supporting slices of bread adjacent said heating means, a cover hinged to said casing, a switch, a dial having numerals thereon, a handle movably supported whereby it may be positioned adjacent any one of said numerals, means for automatically opening said switch at varying intervals of time according to the position of the numeral which is selected for the particular cycle, and means for automatically opening said cover after said switch has been opened.

In testimony whereof I hereunto affix my signature.

CHARLES P. STRITE.